US012786305B2

(12) United States Patent
Hu et al.

(10) Patent No.: US 12,786,305 B2
(45) Date of Patent: Nov. 3, 2026

(54) INFORMATION DISPLAY METHOD AND APPARATUS AND USER EQUIPMENT

(71) Applicant: VIVO MOBILE COMMUNICATION CO., LTD., Guangdong (CN)

(72) Inventors: Zhaofeng Hu, Guangdong (CN); Jian Song, Guangdong (CN); Fei Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 638 days.

(21) Appl. No.: 18/331,868

(22) Filed: Jun. 8, 2023

(65) Prior Publication Data

US 2023/0319176 A1 Oct. 5, 2023

Related U.S. Application Data

(63) Continuation of application No. PCT/CN2021/137777, filed on Dec. 14, 2021.

(30) Foreign Application Priority Data

Dec. 18, 2020 (CN) ......................... 202011503206.8

(51) Int. Cl.
*H04W 60/00* (2009.01)
*H04M 1/724* (2021.01)
*H04W 48/18* (2009.01)

(52) U.S. Cl.
CPC ........... *H04M 1/724* (2021.01); *H04W 48/18* (2013.01); *H04W 60/00* (2013.01)

(58) Field of Classification Search
CPC ..... H04W 76/27; H04W 88/06; H04W 76/15; H04W 48/18; H04W 60/00;
(Continued)

(56) References Cited

U.S. PATENT DOCUMENTS 8,781,469 B2 7/2014 Chen
2010/0255836 A1* 10/2010 Chen .................... H04W 48/20 455/426.1

(Continued)

FOREIGN PATENT DOCUMENTS

CN 104620639 A 5/2015
CN 106332041 A 1/2017

(Continued)

OTHER PUBLICATIONS

European Search Report for Application No. 21905699.1, May 22, 2024, 7 pages.

(Continued)

*Primary Examiner* — Marcus Hammonds
(74) *Attorney, Agent, or Firm* — BROOKS KUSHMAN P.C.

(57) ABSTRACT

This application discloses an information display method and apparatus and user equipment, and belongs to the field of computer technologies. The method includes: if the user equipment is not connected to the first network and the second network at the same time, if the user equipment does not receive indication information, the user equipment obtains history information, where the indication information is used to indicate that the current cell supports dual connectivity of the first network and the second network; and displays, according to the history information, an identifier matching the network that can be connected by the user equipment.

17 Claims, 4 Drawing Sheets

(58) Field of Classification Search

CPC ......... H04W 36/00698; H04W 60/005; H04W 76/11; H04W 76/16; H04M 1/724; H04M 1/72454

See application file for complete search history.

(56) References Cited

U.S. PATENT DOCUMENTS

| | | | | |
|---|---|---|---|---|
| 2015/0244810 | A1 | 8/2015 | Takatsuka | |
| 2018/0368016 | A1* | 12/2018 | Lee | H04W 24/10 |
| 2019/0268962 | A1 | 8/2019 | Wang et al. | |
| 2020/0022200 | A1 | 1/2020 | Lu | |
| 2020/0037387 | A1* | 1/2020 | Lee | H04W 48/16 |
| 2020/0187209 | A1 | 6/2020 | Tamura et al. | |
| 2020/0229254 | A1 | 7/2020 | Chang et al. | |
| 2023/0142719 | A1* | 5/2023 | Zhu | H04W 76/15 370/328 |
| 2023/0156114 | A1 | 5/2023 | Zhu | |

FOREIGN PATENT DOCUMENTS

| | | | |
|---|---|---|---|
| CN | 109561447 | A | 4/2019 |
| CN | 110545565 | A | 12/2019 |
| CN | 110691392 | A | 1/2020 |
| CN | 111246543 | A | 6/2020 |
| CN | 111465070 | A | 7/2020 |
| CN | 112672437 | A | 4/2021 |
| JP | 2020521379 | A | 7/2020 |
| WO | 2019031528 | A1 | 2/2019 |

OTHER PUBLICATIONS

First Japanese Office Action for Japanese Patent Application No. 2023-537100 dated Jun. 12, 2024. 8 pages.

First Office Action for Chinese Application No. 202011503206.8, dated Nov. 18, 2022, 7 Pages.

International Search Report and Written Opinion for Application No. PCT/CN2021/137777, dated Mar. 3, 2022, 9 Pages.

* cited by examiner

INFORMATION DISPLAY METHOD AND APPARATUS AND USER EQUIPMENT

CROSS-REFERENCE TO RELATED APPLICATIONS

This application is a continuation of PCT International Application No. PCT/CN2021/137777 filed on Dec. 14, 2021, which claims priority to Chinese Patent Application No. 202011503206.8, filed on Dec. 18, 2020, which are incorporated herein by reference in their entireties.

TECHNICAL FIELD

The present application belongs to the field of computer technologies, and specifically relates to an information display method and apparatus and user equipment.

BACKGROUND

Currently, a network that can be currently connected by user equipment can be known through network connection information displayed on the user equipment, and can be specifically determined based on the actual status of connection between the user equipment and the current network, or according to support information sent by the current network. However, if the user equipment does not receive the support information of the current network, or if there is a problem with the connection between the user equipment and the current network, the user equipment cannot know information of the network that can be currently connected. As a result, when the user equipment displays the information of the network that can be currently connected, the displayed information is not accurate.

SUMMARY

The purpose of the embodiments of the present application is to provide an information display method and apparatus and user equipment.

According to a first aspect, the embodiment of the present application provides an information display method, executed by a user equipment, including:

in a case that the user equipment is not connected to a first network and a second network at the same time, if the user equipment does not receive indication information, obtaining history information, where the indication information is used to indicate that a current cell supports dual connectivity of the first network and the second network; and displaying, according to the history information, an identifier matching a network that can be connected by the user equipment.

According to a second aspect, the embodiment of the present application provides an information display apparatus, executed by user equipment, including:

an obtaining module, configured to: in a case that the user equipment is not connected to a first network and a second network at the same time, if the user equipment does not receive indication information, obtain history information, where the indication information is used to indicate that a current cell supports dual connectivity of the first network and the second network; and a first display module, configured to display, according to the history information, an identifier matching a network that can be connected by the user equipment.

According to a third aspect, the embodiment of the present application provides user equipment, where the user equipment includes a processor, a memory, and a program or an instruction stored in the memory and executable on the processor, and when the program or the instruction is executed by the processor, steps of the method according to the first aspect are implemented.

According to a fourth aspect, the embodiment of this application provides a readable storage medium. The readable storage medium stores a program or an instruction, and when the program or the instruction is executed by a processor, the steps of the method in the first aspect are implemented.

According to a fifth aspect, the embodiment of the present application provides a chip, where the chip includes a processor and a communications interface, the communications interface is coupled to the processor, and the processor is configured to run a program or an instruction, to implement steps of the method according to the first aspect.

According to a sixth aspect, the embodiment of this application provides a computer program product stored in a nonvolatile storage medium, and the computer program product is executed by at least one processor to implement steps of the method according to the first aspect.

According to a seventh aspect, a communication device is provided, configured to execute steps of the method according to the first aspect.

In the embodiments of the present application, if the user equipment is not connected to the first network and the second network at the same time, and the user equipment does not receive the indication information, a network that can be connected by the user equipment in the current cell can be determined based on the history information stored in the user equipment, so that the corresponding identifier is displayed.

DETAILED DESCRIPTION

The following clearly and completely describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and the character "/" generally represents an "or" relationship between associated objects.

With reference to the accompanying drawings, the following describes in detail the information display method in the embodiments of this application based on specific embodiments and application scenarios.

Figure 1:
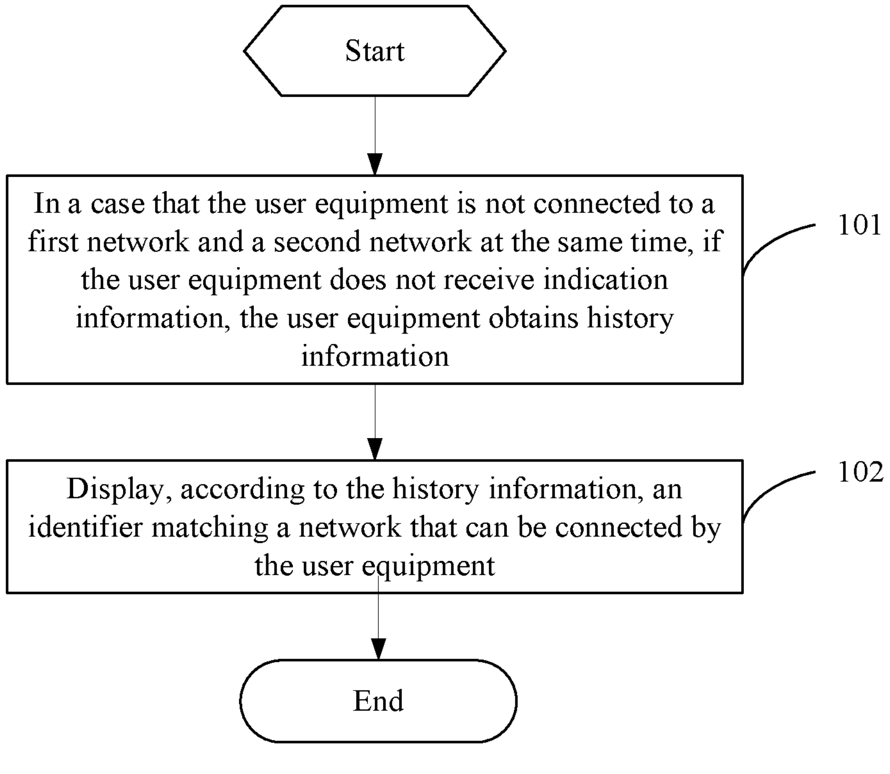
FIG. 1 is a flowchart of an information display method provided by an embodiment of the present application.

FIG. 1 is a flowchart of an information display method provided by an embodiment of the present application. As shown in FIG. 1, the information display method is executed by user equipment, including:

Step 101: In a case that the user equipment is not connected to a first network and a second network at the same time, if the user equipment does not receive indication information, the user equipment obtains history information, where the indication information is used to indicate that a current cell supports dual connectivity of the first network and the second network.

That the user equipment is not connected to the first network and the second network at the same time can be understood as that the user equipment has not established dual connectivity with the first network and the second network, that is, the user equipment has not established connection with the first network and the second network at the same time. The first network may be a long term evolution (LTE) network, and the second network may be a 5G New Radio (NR) network, or the second network may be an LTE network, and the first network may be an NR network.

The current cell is a cell where the user equipment is currently located. The history information is information stored in the user equipment.

Step 102: Display, according to the history information, an identifier matching a network that can be connected by the user equipment.

If it is determined, according to the history information, that the user equipment is connected to the first network and the second network at the same time, a first identifier is then displayed, for example, if it is determined, according to the history information, that the user equipment is connected to the LTE network and the NR network at the same time, a connection identifier of a 5G network is then displayed.

If the user equipment is only connected to the first network, and it is determined, according to the history information, that the user equipment is not connected to the first network and the second network at the same time, a second identifier is displayed, for example, if it is determined, according to the history information, that the user equipment is not connected to the LTE network and the NR network at the same time, a connection identifier of a 4G network is displayed.

Exemplarily, the user equipment may be a mobile phone, a tablet computer, a notebook computer, a palmtop computer, a vehicle-mounted user equipment, a wearable device, an ultra-mobile personal computer (UMPC), a netbook, or a personal digital assistant (PDA), etc., and the embodiments of the present application are not specifically limited thereto.

In this embodiment, if the user equipment is not connected to the first network and the second network at the same time, if the user equipment does not receive indication information, the user equipment obtains history information, where the indication information is used to indicate that the current cell supports dual connectivity of the first network and the second network; and displays, according to the history information, an identifier matching the network that can be connected by the user equipment. If the user equipment is not connected to the first network and the second network, and the user equipment does not receive the indication information, a network that can be connected by the user equipment in the current cell can be determined based on the history information stored in the user equipment, so that the corresponding identifier is displayed, which can improve the accuracy of identifier display.

In the above, step 102 of displaying, according to the history information, an identifier matching a network that can be connected by the user equipment includes the following steps:

- displaying a first identifier in a case that the history information includes first registration information of the user equipment in the current cell, where the first identifier is used to indicate that the user equipment is connected to the first network and the second network at the same time; and
- displaying a second identifier in a case that the history information does not include first registration information of the user equipment in the current cell, where the second identifier is used to indicate that the user equipment is not connected to the first network and the second network at the same time, for example, the user equipment is only connected to the first network.

The first identifier is an identifier identifying that dual connectivity can be performed based on the first network and the second network, that is, the first identifier is an identifier identifying that the first network and the second network can be connected at the same time, for example, if the user equipment is connected to the LTE network and the NR network at the same time, the first identifier may be a connection identifier of the 5G network. Further, if the user equipment is not connected to the LTE network and the NR network, and the history information includes the first registration information of the user equipment in the current cell, the connection identifier of the 5G network is then displayed.

The second identifier is an identifier identifying that dual connectivity cannot be performed based on the first network and the second network, and the second identifier is an identifier identifying that the first network and the second network are not connected at the same time, for example, if the user equipment is connected to the LTE network and is not connected to the NR network, and the history information does not include the first registration information of the user equipment in the current cell, the second identifier may be a connection identifier of the 4G network.

If the user equipment is not connected to the first network and the second network, and the user equipment does not receive the indication information, the user equipment does not know a network that can be connected by the user equipment in the current cell. In this case, a network that can be connected by the user equipment in the current cell can be determined based on the history information stored in the user equipment, so that the corresponding identifier is displayed, which can improve the accuracy of identifier display.

In an embodiment of the present application, the displaying a first identifier in a case that the history information includes first registration information of the user equipment in the current cell includes:

- obtaining the first registration information of the user equipment in the current cell;

in a case that second registration information in the history information matches the first registration information, determining that the history information includes the first registration information; and displaying the first identifier on the user equipment.

Specifically, the user equipment is currently connected to the first network or the second network, the first registration information of the user equipment in the current cell is obtained through the first network or the second network, and then matching between the first registration information and the second registration information in the history information is performed. If the information can be matched, the first identifier is displayed. The first registration information may include a tracking area code (TAC), a physical-layer cell identity (PCI), and a frequency.

For example, initially, the user equipment registers to the LTE network, obtains currently registered LTE cell information, that is, the first registration information including the TAC, PCI, and frequency of the current cell, and compares the TAC, PCI, and frequency with the TAC, PCI, and frequency of the registration information stored in the history information. If the comparison is successful, it is considered that the history information stores the currently registered LTE cell information, and the first identifier is displayed on the user equipment.

In this embodiment, by matching the obtained first registration information of the user equipment in the current cell with the second registration information in the history information, it is determined whether the history information includes the first registration information, and if the history information includes the first registration information, the first identifier is displayed on the user equipment. A network that can be connected by the user equipment in the current cell can be determined based on the history information stored in the user equipment, so that the corresponding identifier is displayed, which can improve the accuracy of identifier display.

In an embodiment of the present application, if the history information includes the first registration information of the user equipment in the current cell, the displaying the first identifier on the user equipment includes:

obtaining, if the history information includes the first registration information of the user equipment in the current cell, a storage time for the user equipment to store the first registration information; and displaying the first identifier if the time interval between the storage time and the current time of the user equipment is less than a preset threshold.

Specifically, the history information may include registration information of the user equipment in multiple cells. In a case that the user equipment is connected to the first network and the second network at the same time in a target cell, and/or in a case that the user equipment receives the first indication information, the registration information of the user equipment in the target cell is obtained, and the registration information of the target cell is stored in the history information. The first indication information is used to indicate that the target cell supports the first network and the second network, and the target cell is one of the multiple cells.

In the above, when the first registration information is stored, it corresponds to a storage time. In this embodiment, the storage time of the first registration information is compared with the current time of the user equipment, and if the time interval between the storage time and the current time of the user equipment is less than a preset threshold, the first identifier is displayed. The preset threshold can be set according to actual conditions, and is not limited here.

In this embodiment, if the time interval between the storage time and the current time of the user equipment is less than a preset threshold, it can be considered that the first registration information is within the validity period, and a connection that can be implemented by the user can be determined based on the first registration information, that is, the user equipment can be connected to the first network and the second network at the same time, and the first identifier is displayed.

Further, if the interval between the storage time and the current time of the user equipment is not less than a preset threshold, a second identifier is displayed, and the second registration information in the history information is deleted. The second registration information is registration information matching the first registration information in the history information.

If the time interval between the storage time and the current time of the user equipment is not less than the preset threshold, it can be considered that the first registration information is not within the validity period, and the first registration information cannot be used to determine the connection that can be implemented by the user. It is considered that the user equipment cannot be connected to the first network and the second network at the same time, the second identifier is displayed, and the second registration information stored on the user equipment is deleted. When the first registration information is used to determine the network that can be connected by the user equipment in the current cell, with reference to the storage time of the first registration information, the accuracy of identifier display can be further improved.

In an embodiment of the present application, the second registration information is registration information that is of the user equipment in the current cell and that is obtained when the user equipment is connected to the first network and the second network at the same time.

Alternatively, the second registration information is registration information that is of the user equipment in the current cell and that is obtained when the user equipment receives the indication information.

Specifically, the history information may include registration information of the user equipment in multiple cells. The second registration information is the registration information matching the first registration information in the history information. The second registration information is the registration information once stored by the user equipment.

In a case that the user equipment is connected to the first network and the second network at the same time in a target cell, and/or in a case that the user equipment receives the first indication information, the registration information of the user equipment in the target cell is obtained, and the registration information of the target cell is stored in the history information. The first indication information is used to indicate that the target cell supports the first network and the second network, and the target cell is one of the multiple cells. In this embodiment, the current cell is one of the multiple cells.

In an embodiment of the present application, the method further includes the following steps:

displaying a first identifier when the user equipment is registered with a first cell, where the first cell supports the first network and the second network;

when the user equipment performs cell handover or re-registration, if the second cell to which the user equipment is handed over or the second cell for re-registration supports the first network and does not support the second network, starting a timer; and when the timer expires, if the cell currently registered by the user equipment supports the first network and does not support the second network, switching display of the first identifier to display of a second identifier.

Further, when the timer expires, if the cell currently registered by the user equipment supports both the first network and the second network, for example, the user equipment switches from the registered second cell to the currently registered cell, and the currently registered cell supports both the first network and the second network, the first identifier is still displayed.

In this embodiment, when the user equipment performs cell handover or re-registration, the user equipment does not immediately switch the displayed identity based on whether the cell to which the user equipment is handed over supports dual connectivity, and instead waits for a preset period of time (which is determined according to the timing of the timer). If network connections supported by the cell currently registered by the user equipment and the first cell previously registered by the user equipment are different after the user equipment waits for the preset period of time, for example, the first cell supports dual connectivity, but the currently registered cell does not support dual connectivity, the displayed identifier is switched. This can avoid the problem of frequent switching of the displayed identifier when the user equipment changes frequently the support status of dual connectivity in the registered cell.

Figure 2:
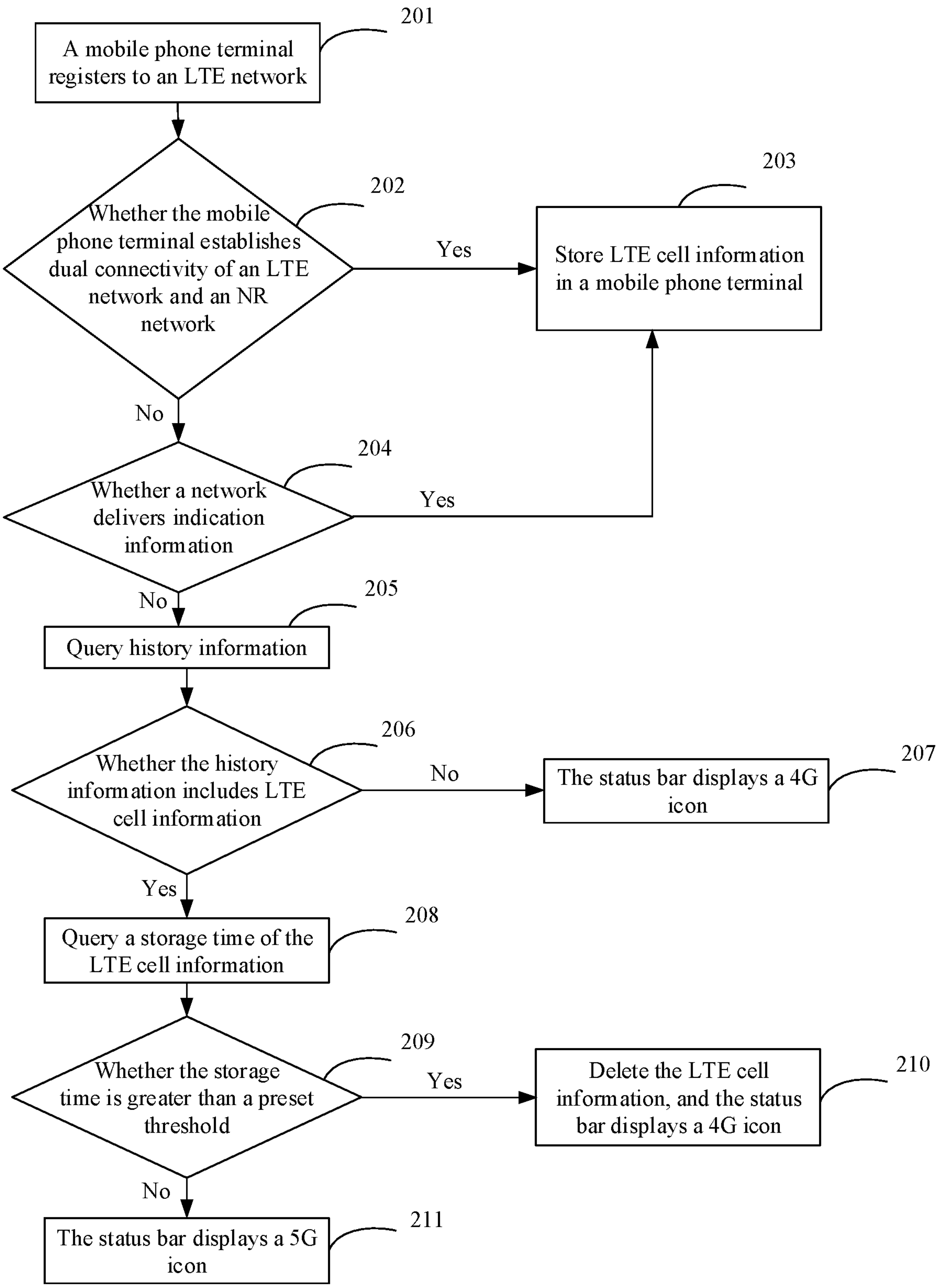
FIG. 2 is another flowchart of an information display method provided by an embodiment of the present application.

The information display method provided by the present application will be illustrated below by taking an example in which the user equipment is a mobile phone terminal, the first network is an LTE network, and the second network is an NR network. As shown in FIG. 2, the following steps are included.

Step 201: A mobile phone terminal registers to an LTE network.

Step 202: Determine whether the mobile phone terminal has currently established dual connectivity of the LTE network and the NR network, if yes, proceed to step 203 for execution, and if not, proceed to step 204 for execution.

Step 203: Store registered LTE cell information in a storage medium of the mobile phone terminal, where the registration information may include TAC, PCL, a frequency, and a registration time (that is, a storage time) of the LTE cell, the storage medium of the mobile phone terminal is not limited to databases, files, or the like, and if the record has been stored in the storage medium, the registration time is updated to the current time.

Step 204: If the mobile phone terminal does not currently establish dual connectivity of the LTE network and the NR network, determine whether the network delivers indication information to indicate whether the current cell supports dual connectivity of the LTE network and the NR network, for example, the indication information may be an upper layer indication (ULI), and when ULI=1, it means that the current cell supports dual connectivity of the LTE network and the NR network. If the network delivers indication information indicating that the current cell supports dual connectivity of the LTE network and the NR network, a status bar of the mobile phone terminal displays a 5G icon and proceed to step 203 for execution; and if not, proceed to step 205 for execution.

Step 205: If the network does not send indication information, that is, does not indicate that the current cell supports dual connectivity of the LTE network and the NR network, query hi story information.

Step 206: Determine whether the LTE registration information (also called LTE cell information) of the current cell is stored in the history information. That is, the obtained LTE registration information of the current cell is compared with the registration information in the history information, and the content of the comparison may include the TAC, PCI, and frequency of the LTE cell.

Step 207: If there is no LTE cell information in the history information, the status bar of the mobile phone terminal displays a 4G icon.

Step 208: If the LTE cell information is stored in the history information, obtain a record time (that is, a storage time) of this piece of information.

Step 209: According to the storage time of this piece of information and the current time, determine whether the time interval is greater than a preset threshold.

Step 210: If the time interval is greater than the preset threshold, delete the piece of LTE cell information from the storage medium, and the status bar of the mobile phone terminal displays a 4G icon.

Step 211: If the time interval is less than the preset threshold, the status bar of the mobile phone terminal displays a 5G icon.

Figure 3:
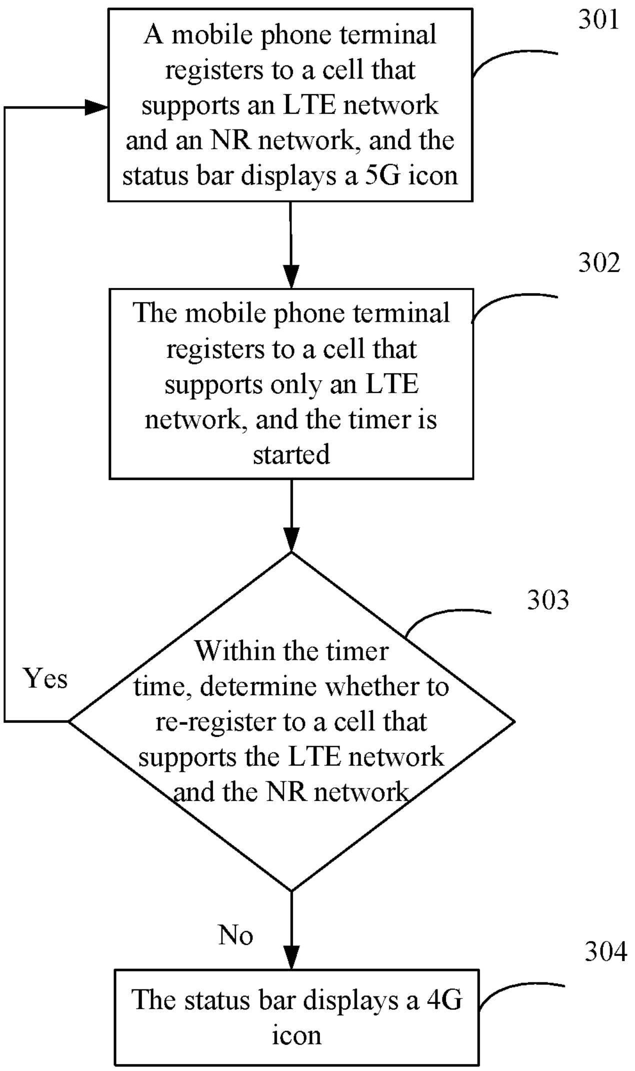
FIG. 3 is another flowchart of an information display method provided by an embodiment of the present application.

The information display method provided by the present application will be illustrated below by taking an example in which the user equipment is a mobile phone terminal, the first network is an LTE network, and the second network is an NR network. As shown in FIG. 3, the following steps are included.

Step 301: A mobile phone terminal registers to a cell that supports dual connectivity of the LTE network and the NR network, and the status bar displays a 5G icon.

Step 302: The mobile phone terminal switches or re-registers, and registers to a cell that only supports the LTE network, the status bar still displays the 5G icon, and an N-second timer is started.

Step 303: Within the timer time, determine whether to re-register to a cell that supports dual connectivity of the LTE network and the NR network, and if yes, the status bar of the user equipment displays a 5G icon.

Step 304: If the timer expires and the user equipment registers to a cell that only supports the LTE network, the status bar of the user equipment displays a 4G icon.

In the above, by adding the timer, this avoids a problem that the mobile phone terminal switches between a cell that only supports the LTE network and a cell that supports both the LTE network and the NR network, resulting in frequent switching between the 5G icon and the 4G icon in the status bar.

The information display method provided in the embodiment of the present application may be executed by an information display apparatus, or a control module in the information display apparatus for executing the information display method. In this embodiment of the present application, an example in which the information display method is performed by an information display apparatus is used to describe the information display method provided by the embodiments of the present application.

Figure 4:
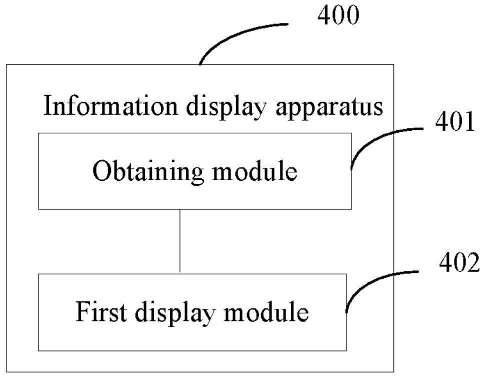
FIG. 4 is a structural diagram of an information display apparatus provided by an embodiment of the present application.

As shown in FIG. 4, FIG. 4 is a structural diagram of an information display apparatus provided in an embodiment of the present application. The information display apparatus 400 provided in this embodiment is executed by user equipment, and includes:

an obtaining module 401, configured to: in a case that the user equipment is not connected to a first network and a second network at the same time, if the user equipment does not receive indication information, obtain history information, where the indication information is used to indicate that a current cell supports dual connectivity of the first network and the second network; and a first display module 402, configured to display, according to the history information, an identifier matching a network that can be connected by the user equipment.

Further, the first display module 402 includes:

a first display submodule, configured to: in a case that the history information includes first registration information of the user equipment in the current cell, display a first identifier, where the first identifier is used to indicate that the user equipment is connected to the first network and the second network at the same time; and a second display submodule, configured to: in a case that the history information does not include first registration information of the user equipment in the current cell, display a second identifier, where the second identifier is used to indicate that the user equipment is not connected to the first network and the second network at the same time.

Further, the first display submodule includes:

a first obtaining unit, configured to obtain first registration information of the user equipment in the current cell;

a determining unit, configured to: in a case that second registration information in the history information matches the first registration information, determine that the history information includes the first registration information; and a first display unit, configured to display the first identifier on the user equipment.

Further, the second registration information is registration information that is of the user equipment in the current cell and that is obtained when the user equipment is connected to the first network and the second network at the same time; or the second registration information is registration information that is of the user equipment in the current cell and that is obtained when the user equipment receives the indication information.

Further, the first display submodule includes:

a second obtaining unit, configured to: if the history information includes the first registration information of the user equipment in the current cell, obtain a storage time for the user equipment to store the first registration information; and a second display unit, configured to: if the time interval between the storage time and the current time of the user equipment is less than a preset threshold, display the first identifier.

Further, the information display apparatus 400 also includes:

a second display module, configured to: if the interval between the storage time and the current time of the user equipment is not less than a preset threshold, display the second identifier; and a deletion module, configured to delete second registration information in the history information, where the second registration information is registration information in the history information that matches the first registration information.

Further, the information display apparatus 400 also includes:

a third display module, configured to display a first identifier when the user equipment is registered with a first cell, where the first cell supports the first network and the second network;

a timer start module, configured to: when the user equipment performs cell handover or re-registration, if the second cell to which the user equipment is handed over or the second cell for re-registration supports the first network and does not support the second network, start a timer; and a fourth display module, configured to: when the timer expires, if the cell currently registered by the user equipment supports the first network and does not support the second network, switch display of the first identifier to display of a second identifier.

The information display apparatus 400 according to embodiments of the present application can implement the processes performed by user equipment in the method embodiments in FIG. 1, and achieve the same technical effect. To avoid repetition, details are not described herein again.

Figure 5:
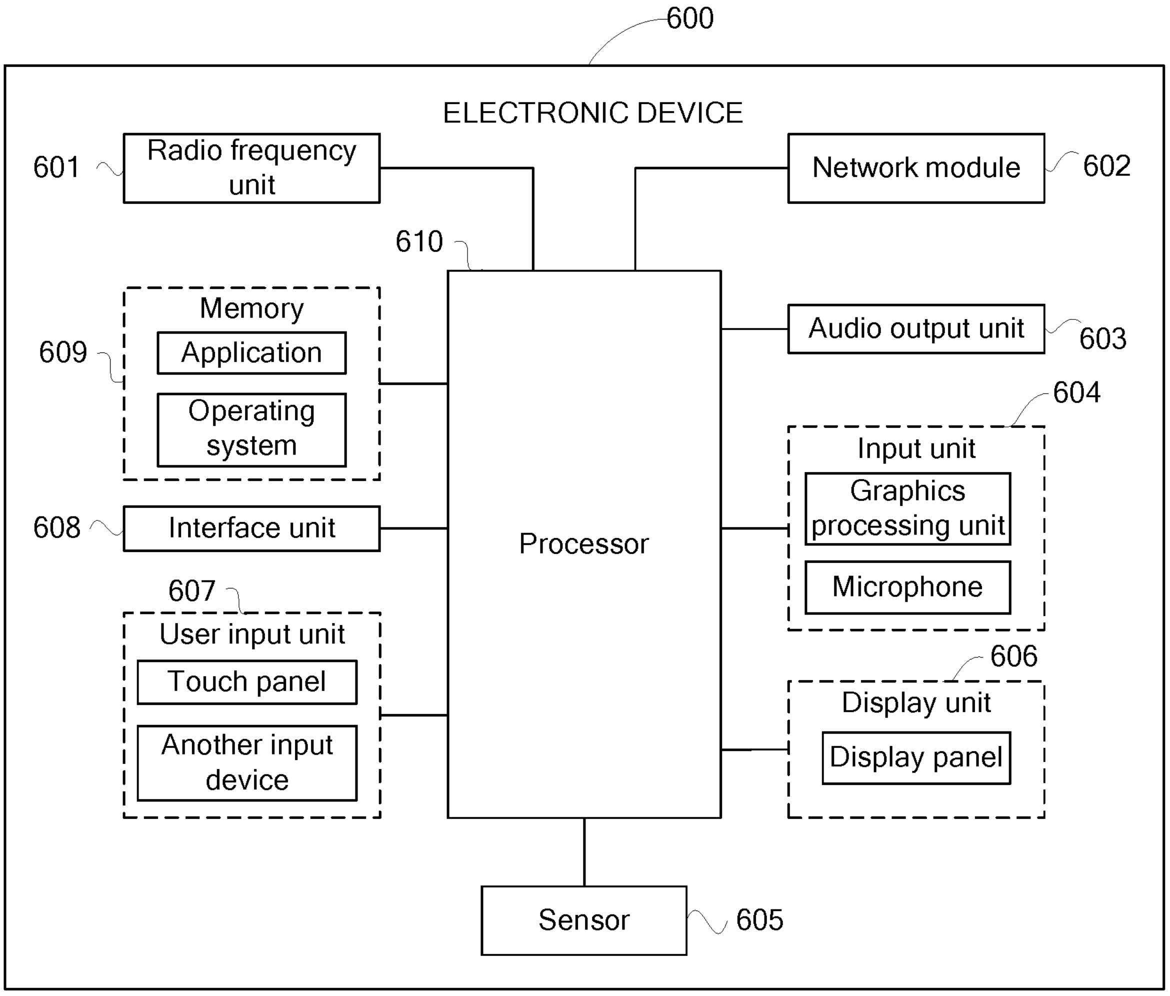
FIG. 5 is a structural diagram of user equipment according to an embodiment of this application.

FIG. 5 is a schematic diagram of a hardware structure of user equipment according to an embodiment of this application. As shown in FIG. 5, the embodiment of the present application also provides user equipment, including a processor 610, a memory 609, and a program or instruction stored in the memory 609 and executable on the processor 610. The program or instruction is executed by the processor 610 to implement the various processes of the foregoing information display method embodiments, and can achieve the same technical effect. To avoid repetition, details are not repeated herein.

It should be noted that the user equipment in this embodiment of the present application includes the above-mentioned mobile user equipment and non-mobile user equipment.

The user equipment 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

A person skilled in the art can understand that the user equipment 600 may further include a power supply (for example, a battery) that supplies power to the components. The power supply may be logically connected to the processor 610 by using a power management system, so as to implement functions such as charging management, discharging management, and power consumption management by using the power management system. The user equipment is not limited to the user equipment structure shown in FIG. 5. The user equipment may include more or fewer components than those shown in the figure, or combine some components, or have a different component arrangement. Details are not described herein.

The processor 610 is configured to: in a case that the user equipment is not connected to a first network and a second network at the same time, if the user equipment does not receive indication information, obtain history information, where the indication information is used to indicate that a current cell supports dual connectivity of the first network and the second network;

The display unit 606 is configured to display, according to the history information, an identifier matching a network that can be connected by the user equipment.

Further, the display unit 606 is configured to: in a case that the history information includes first registration information of the user equipment in the current cell, display a first identifier, where the first identifier is used to indicate that the user equipment is connected to the first network and the second network at the same time; and displaying a second identifier in a case that the history information does not include first registration information of the user equipment in the current cell, where the second identifier is used to indicate that the user equipment is not connected to the first network and the second network at the same time.

Further, the processor 610 is configured to: obtain first registration information of the user equipment in the current cell; and in a case that second registration information in the history information matches the first registration information, determine that the history information includes the first registration information.

The display unit 606 is configured to display the first identifier on the user equipment.

Further, the processor 610 is configured to: if the history information includes the first registration information of the user equipment in the current cell, obtain a storage time for the user equipment to store the first registration information.

The display unit 606 is configured to: if the time interval between the storage time and the current time of the user equipment is less than a preset threshold, display the first identifier.

Further, the display unit 606 is configured to: if the interval between the storage time and the current time of the user equipment is not less than a preset threshold, display the second identifier.

The processor 610 is configured to delete second registration information in the history information, where the second registration information is registration information in the history information that matches the first registration information.

Further, the second registration information is registration information that is of the user equipment in the current cell and that is obtained when the user equipment is connected to the first network and the second network;

or the second registration information is registration information that is of the user equipment in the current cell and that is obtained when the user equipment receives the indication information.

Further, the display unit 606 is configured to display a first identifier when the user equipment is registered with a first cell, where the first cell supports the first network and the second network.

The processor 610 is configured to: when the user equipment performs cell handover or re-registration, if the second cell to which the user equipment is handed over or the second cell for re-registration supports the first network and does not support the second network, start a timer.

The display unit 606 is further configured to: when the timer expires, if the cell currently registered by the user equipment supports the first network and does not support the second network, switch display of the first identifier to display of a second identifier.

In the user equipment 600 in this embodiment, if the user equipment is not connected to the first network and the second network at the same time, if the user equipment does not receive indication information, the user equipment obtains history information, where the indication information is used to indicate that the current cell supports dual connectivity of the first network and the second network; and displays, according to the history information, an identifier matching the network that can be connected by the user equipment. If the user equipment is not connected to the first network and the second network, and the user equipment does not receive the indication information, a network that can be connected by the user equipment in the current cell can be determined based on the history information stored in the user equipment, so that the corresponding identifier is displayed, which can improve the accuracy of identifier display.

An embodiment of the present application further provides a readable storage medium. The readable storage medium stores a program or an instruction, and when the program or the instruction is executed by a processor, the various processes of the foregoing information display method embodiment is performed and the same technical effects can be achieved. To avoid repetition, details are not described herein again.

The processor is a processor in the user equipment in the foregoing embodiments. The readable storage medium includes a computer-readable storage medium, such as a computer read-only memory (ROM), a random access memory (RAM), a magnetic disk, an optical disc, or the like.

An embodiment of the present application further provides a chip, the chip includes a processor and a communication interface, the communication interface is coupled to the processor, and the processor is configured to run programs or instructions to implement each process of the embodiment of the foregoing information display method and the same technical effects can be achieved. To avoid repetition, details are not described herein again.

It should be understood that the chip mentioned in this embodiment of this application may also be referred to as a system-level chip, a system chip, a chip system, or an on-chip system chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

What is claimed is:

1. An information display method, applied to a user equipment, comprising:

in a case that the user equipment is not connected to a first network and a second network at the same time, if the user equipment does not receive indication information, obtaining history information, wherein the indication information is used to indicate that a current cell supports dual connectivity of the first network and the second network; and displaying, according to the history information, an identifier matching a network that can be connected by the user equipment, wherein the displaying, according to the history information, an identifier matching a network that can be connected by the user equipment comprises:

displaying a first identifier in a case that the history information comprises first registration information of the user equipment in the current cell, wherein the first identifier is used to indicate that the user equipment is able to be connected to the first network and the second network at the same time; and in a case that the history information does not comprise first registration information of the user equipment in the current cell, displaying a second identifier, wherein the second identifier is used to indicate that the user equipment is not able to be connected to the first network and the second network at the same time.

2. The method according to claim 1, wherein the displaying a first identifier in a case that the history information comprises first registration information of the user equipment in the current cell comprises:

obtaining the first registration information of the user equipment in the current cell;

in a case that second registration information in the history information matches the first registration information, determining that the history information comprises the first registration information; and displaying the first identifier on the user equipment.

3. The method according to claim 2, wherein the second registration information is registration information that is of the user equipment in the current cell and that was obtained when the user equipment was connected to the first network and the second network at the same time previously;

or the second registration information is registration information that is of the user equipment in the current cell and that was obtained when the user equipment received the indication information previously.

4. The method according to claim 1, wherein the displaying a first identifier in a case that the history information comprises first registration information of the user equipment in the current cell comprises:

obtaining, if the history information comprises the first registration information of the user equipment in the current cell, a storage time for the user equipment to store the first registration information; and displaying the first identifier if the time interval between the storage time and the current time of the user equipment is less than a preset threshold.

5. The method according to claim 4, after the obtaining, if the history information comprises the first registration information of the user equipment in the current cell, a storage time for the user equipment to store the first registration information, further comprising:

if the time interval between the storage time and the current time of the user equipment is not less than a preset threshold, displaying the second identifier; and deleting second registration information in the history information, wherein the second registration information is registration information in the history information that matches the first registration information.

6. The method according to claim 1, wherein the method further comprises:

displaying a first identifier when the user equipment is registered with a first cell, wherein the first cell supports the first network and the second network;

when the user equipment performs cell handover or re-registration, if the second cell to which the user equipment is handed over or the second cell for re-registration supports the first network and does not support the second network, starting a timer; and when the timer expires, if the cell currently registered by the user equipment supports the first network and does not support the second network, switching display of the first identifier to display of a second identifier.

7. A user equipment, comprising a processor, a memory, and a program or instruction stored on the memory and executable on the processor, when the program or instruction is executed by the processor, implementing:

in a case that the user equipment is not connected to a first network and a second network at the same time, if the user equipment does not receive indication information, obtaining history information, wherein the indication information is used to indicate that a current cell supports dual connectivity of the first network and the second network; and displaying, according to the history information, an identifier matching a network that can be connected by the user equipment, wherein the displaying, according to the history information, an identifier matching a network that can be connected by the user equipment comprises:

displaying a first identifier in a case that the history information comprises first registration information of the user equipment in the current cell, wherein the first identifier is used to indicate that the user equipment is able to be connected to the first network and the second network at the same time; and in a case that the history information does not comprise first registration information of the user equipment in the current cell, displaying a second identifier, wherein the second identifier is used to indicate that the user equipment is not able to be connected to the first network and the second network at the same time.

8. The user equipment according to claim 7, wherein the displaying a first identifier in a case that the history information comprises first registration information of the user equipment in the current cell comprises:

obtaining the first registration information of the user equipment in the current cell;

in a case that second registration information in the history information matches the first registration information, determining that the history information comprises the first registration information; and displaying the first identifier on the user equipment.

9. The user equipment according to claim 8, wherein the second registration information is registration information that is of the user equipment in the current cell and that was obtained when the user equipment was connected to the first network and the second network at the same time previously;

or the second registration information is registration information that is of the user equipment in the current cell and that was obtained when the user equipment received the indication information previously.

10. The user equipment according to claim 7, wherein the displaying a first identifier in a case that the history information comprises first registration information of the user equipment in the current cell comprises:

obtaining, if the history information comprises the first registration information of the user equipment in the current cell, a storage time for the user equipment to store the first registration information; and displaying the first identifier if the time interval between the storage time and the current time of the user equipment is less than a preset threshold.

11. The user equipment according to claim 10, after the obtaining, if the history information comprises the first registration information of the user equipment in the current cell, a storage time for the user equipment to store the first registration information, further comprising:

if the time interval between the storage time and the current time of the user equipment is not less than a preset threshold, displaying the second identifier; and deleting second registration information in the history information, wherein the second registration information is registration information in the history information that matches the first registration information.

12. The user equipment according to claim 7, wherein when the program or instruction is executed by the processor, further implementing:

displaying a first identifier when the user equipment is registered with a first cell, wherein the first cell supports the first network and the second network;

when the user equipment performs cell handover or re-registration, if the second cell to which the user equipment is handed over or the second cell for re-registration supports the first network and does not support the second network, starting a timer; and when the timer expires, if the cell currently registered by the user equipment supports the first network and does not support the second network, switching display of the first identifier to display of a second identifier.

13. A non-transitory readable storage medium, storing a program or an instruction, when the program or instruction is executed by a processor, implementing:

in a case that the user equipment is not connected to a first network and a second network at the same time, if the user equipment does not receive indication information, obtaining history information, wherein the indication information is used to indicate that a current cell supports dual connectivity of the first network and the second network; and displaying, according to the history information, an identifier matching a network that can be connected by the user equipment, wherein the displaying, according to the history information, an identifier matching a network that can be connected by the user equipment comprises:

displaying a first identifier in a case that the history information comprises first registration information of the user equipment in the current cell, wherein the first identifier is used to indicate that the user equipment is able to be connected to the first network and the second network at the same time; and in a case that the history information does not comprise first registration information of the user equipment in the current cell, displaying a second identifier, wherein the second identifier is used to indicate that the user equipment is not able to be connected to the first network and the second network at the same time.

14. The non-transitory readable storage medium according to claim 13, wherein the displaying a first identifier in a case that the history information comprises first registration information of the user equipment in the current cell comprises:

obtaining the first registration information of the user equipment in the current cell;

in a case that second registration information in the history information matches the first registration information, determining that the history information comprises the first registration information; and displaying the first identifier on the user equipment.

15. The non-transitory readable storage medium according to claim 14, wherein the second registration information is registration information that is of the user equipment in the current cell and that was obtained when the user equipment was connected to the first network and the second network at the same time previously;

or the second registration information is registration information that is of the user equipment in the current cell and that was obtained when the user equipment received the indication information previously.

16. The non-transitory readable storage medium according to claim 15, wherein the displaying a first identifier in a case that the history information comprises first registration information of the user equipment in the current cell comprises:

obtaining, if the history information comprises the first registration information of the user equipment in the current cell, a storage time for the user equipment to store the first registration information; and displaying the first identifier if the time interval between the storage time and the current time of the user equipment is less than a preset threshold.

17. The non-transitory readable storage medium according to claim 16, after the obtaining, if the history information comprises the first registration information of the user equipment in the current cell, a storage time for the user equipment to store the first registration information, further comprising:

if the time interval between the storage time and the current time of the user equipment is not less than a preset threshold, displaying the second identifier; and deleting second registration information in the history information, wherein the second registration information is registration information in the history information that matches the first registration information.

* * * * *